(No Model.)
H. P. WISER.
BUCKLE.
No. 400,379. Patented Mar. 26, 1889.
Fig.1. Fig.2. Fig.3.
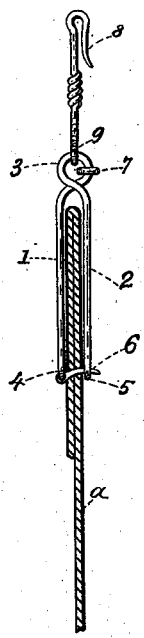 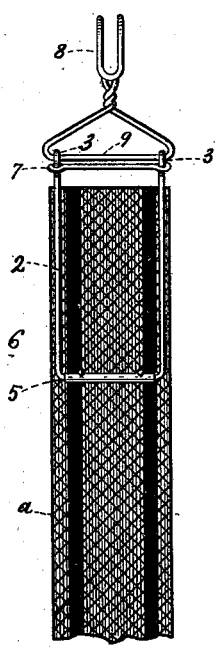 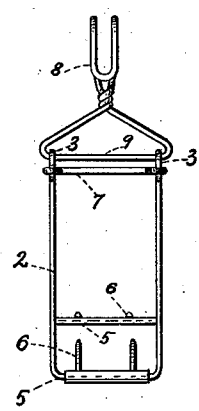
Fig.4.
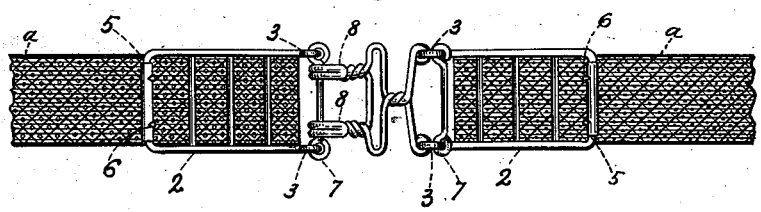
Witnesses.
Harriet Johnson
Arthur J. Sangster
Henry P. Wiser  Inventor.
By James Sangster,
Attorney

UNITED STATES PATENT OFFICE.

HENRY P. WISER, OF BUFFALO, NEW YORK.

BUCKLE.

SPECIFICATION forming part of Letters Patent No. 400,379, dated March 26, 1889.

Application filed January 15, 1889. Serial No. 296,431. (No model.)

*To all whom it may concern:*

Be it known that I, HENRY P. WISER, a citizen of the United States, residing in Buffalo, in the county of Erie and State of New York, have invented certain new and useful Improvements in Clasp-Buckles, of which the following is a specification.

The object of my invention is to produce a clasp or buckle adapted for a belt-clasp, hose-supporter, garter-clasp, or for-suspenders or other similar purposes, all of which will be fully and clearly hereinafter described and claimed, reference being had to the accompanying drawings, in which—

Figure 1 is a side elevation of the device, showing it attached to a piece of woven material in section. Fig. 2 is a front elevation of the clasp and a small portion of elastic material to which it is attached. Fig. 3 is a front elevation showing the tongues turned upward. Fig. 4 is a front elevation showing the invention adapted for use as a belt-clasp.

In said drawings, 1 and 2 represent the double frame-work of the buckle, consisting of the two frame portions 1 and 2, united at the top preferably by a coil-spring, 3, on each side, so that the lower ends, 4 and 5, will spring toward each other; but the device will operate without having the portions 3 made in the form of a spring—that is, it could be of material that would be rigid without acting as a spring, because the buckle can be used without having the frame-pieces 1 and 2 spring apart, as the material *a* may be secured between them by throwing the tongues 6 backward, then passing the material *a* up between the frames and turning the points of the tongues 6 against it, and then drawing it down. This will cause the tongues to pass through the material and into the position shown in Fig. 1. The material *a* may then be released by drawing it upward until the tongues 6 are out. The tongues may then be turned backward and the material withdrawn.

At the lower end, 4, is pivoted one or more pointed tongues, 6. For many uses two, as shown, will answer; but there may be more, if required. These tongues 6, it will be noticed, swing over and lie on the bottom cross-bar, 5, of the frame 2. (See Fig. 1.) At the top of the frame portions is a holding cross-bar, 7, linked to each of the portions 3. Its object is to keep the upper portions of the frame in position. A hook, 8, is secured to the top of the frame by having the lower portion, 9, (which is formed in one piece with it, as shown,) pass through the spring-coils 3. The object of the hook is to provide the means for hooking the device to a suspender, in the usual way, and any article can then be secured and held without the use of a button by fastening the buckle portion, as shown in Fig. 1. When used as a belt-clasp, or for any similar purpose, there may be two hooks, 8, as shown in Fig. 4.

The operation of the device is as follows: The article to be attached to the buckle or clasp is first passed up in between the frame portions 1 and 2, which operation turns the tongues also, as shown in Fig. 3. By now pressing the points of the tongue forward against the article, *a*, to be secured, and drawing the article downward at the same time, the points of the tongue will pass through (see Fig. 1) and hold it securely.

When it is designed for holding any article without buttons—a pair of pants, for instance—an additional cross-bar, 5, and pivoted tongue 6 may be secured to the frame portions, as shown in Fig. 3, if desired.

I claim as my invention—

A buckle or clasp consisting of a double frame portion formed by wire doubled upon itself so as to form two frames with an opening between them, a tongue member pivoted to the lower end of one of the frame portions adapted to swing over and rest its end portions on the lower cross part of the other frame portion, and a holding-hook pivoted to the upper portion of the frame, substantially as described.

HENRY P. WISER.

Witnesses:
 HARRIET JOHNSON,
 JAMES SANGSTER.